United States Patent
Neu et al.

(10) Patent No.: US 8,201,843 B2
(45) Date of Patent: Jun. 19, 2012

(54) TRAILER HITCH SYSTEM

(76) Inventors: Robert Neu, Crawfordville, FL (US); Millie Harrison, Crawfordville, FL (US)

( * ) Notice: Subject to any disclaimer, the term of this patent is extended or adjusted under 35 U.S.C. 154(b) by 124 days.

(21) Appl. No.: 12/660,292

(22) Filed: Feb. 24, 2010

(65) Prior Publication Data

US 2011/0204593 A1 Aug. 25, 2011

(51) Int. Cl.
B60D 1/38 (2006.01)
B60D 1/40 (2006.01)
B60D 1/44 (2006.01)

(52) U.S. Cl. ........... 280/479.3; 280/477; 280/478.1; 280/479.1

(58) Field of Classification Search ........ 280/415.1, 280/416, 456.1, 477, 478.1, 479.1, 479.2, 280/479.3, 491.1, 491.2, 511
See application file for complete search history.

(56) References Cited

U.S. PATENT DOCUMENTS

| | | | |
|---|---|---|---|
| 2,753,192 A * | 7/1956 | Davis et al. | 280/477 |
| 3,848,895 A | 11/1974 | Christopher | |
| 3,938,122 A * | 2/1976 | Mangus | 340/431 |
| 4,042,254 A * | 8/1977 | Allen | 280/479.3 |
| 4,466,632 A | 8/1984 | DeVorak | |
| 4,807,899 A | 2/1989 | Belcher | |
| 5,048,854 A | 9/1991 | Clark | |
| 5,072,962 A * | 12/1991 | Webb | 280/414.1 |
| 5,277,446 A * | 1/1994 | Hamel | 280/477 |
| 5,938,227 A | 8/1999 | Hills | |
| 6,386,514 B1 * | 5/2002 | Ray | 254/323 |
| 6,494,477 B1 | 12/2002 | Parker | |
| 6,511,089 B1 * | 1/2003 | Kores, Sr. | 280/478.1 |
| 6,948,734 B2 | 9/2005 | Popham | |
| 6,951,345 B2 * | 10/2005 | Wilks | 280/477 |
| 7,290,755 B1 | 11/2007 | Thibodeaux | |
| 7,425,013 B1 * | 9/2008 | Bartlett | 280/479.3 |
| 2007/0138760 A1 * | 6/2007 | Granzow | 280/491.2 |

* cited by examiner

Primary Examiner — Tony H. Winner
Assistant Examiner — Marc Scharich
(74) Attorney, Agent, or Firm — J. W. Horton (57) ABSTRACT

The present invention comprises a trailer hitch system, for attaching a trailer to a vehicle having a winch attached to the frame of a vehicle, a hollow receiver attached to the frame of a vehicle, where the receiver has a receiver opening, which is defined by a top guide, bottom guide and at least two side beams. The winch wire attaches to the winch, travels through the receiver, out of the receiver opening and attaches to a hitch bar at a tab. When the winch is activated the winch wire pulls hitch bar and thus, the attached trailer, into the receiver opening. A bearing located on the forward facing side of the hitch bar reduces friction between the hitch bar and the receiver as the hitch bar enters the receiver opening.

20 Claims, 11 Drawing Sheets

TRAILER HITCH SYSTEM

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of devices for hitching a trailer to a vehicle. More specifically, the invention comprises a trailer hitch system which contains a winch for securing and attaching a trailer to a vehicle.

2. Description of the Related Art

A trailer hitch is a device which attaches to a vehicle for towing purposes. Most trailer hitch systems utilize a receiver-type hitch. A removable ball mount (hitch bar), typically a rectangular bar, fits into the receiver. In order to attach the receiver to a trailer, an individual would remove the ball mount (hitch bar), attach it to a coupling on a trailer, either back the vehicle or pull the trailer as close as possible to one another and manually fit the hitch bar into the receiver.

It is often difficult to align the vehicle and the trailer, taking great strength, accuracy and often at least two individuals.

Therefore what is needed is a device which allows the user to easily remove the hitch bar from the receiver, connect to a trailer and without effort return the hitch bar to the receiver. The present invention achieves this objective, as well as others that are explained in the following description.

BRIEF SUMMARY OF THE INVENTION

The present invention comprises a trailer hitch system, for attaching a trailer to a vehicle having a winch attached to the frame of a vehicle, a hollow receiver attached to the frame of a vehicle, wherein the receiver contains a receiver opening. The receiver opening is defined by a top guide, bottom guide and at least two side beams. The winch wire attaches to the winch, travels through the receiver, out of the receiver opening and attaches to a hitch bar at a tab.

When the winch is activated the winch wire pulls the hitch bar and thus, the attached trailer, into the receiver opening. A bearing located on the forward facing side of the hitch bar reduces friction between the hitch bar and the receiver as the hitch bar enters the receiver opening. The hitch bar can be pulled into the receiver opening from nearly any angle and therefore reduces the need for careful alignment of the vehicle and the trailer.

REFERENCE NUMERALS IN THE DRAWINGS

| | |
|---|---|
| 10 trailer hitch system | 12 winch |
| 14 winch wire | 16 bracket |
| 18 receiver | 20 roll bearing |
| 22 hitch bar | 24 ball pin |
| 26 tab | 28 bracket |
| 30 side beam | 32 top bar |
| 34 guide | 36 receiver opening |
| 38 top guide | 40 bottom guide |
| 42 bolt | 44 trailer |
| 46 vehicle | 48 trailer attachment |
| 50 frame | 52 pin |
| 54 pin notch | 56 tongue |
| 58 transmitter | 60 fob |
| 62 spherical bearing | 64 bolt top |
| 66 winch wire loop | 68 bolt |

DETAILED DESCRIPTION OF THE INVENTION

Figure 1:
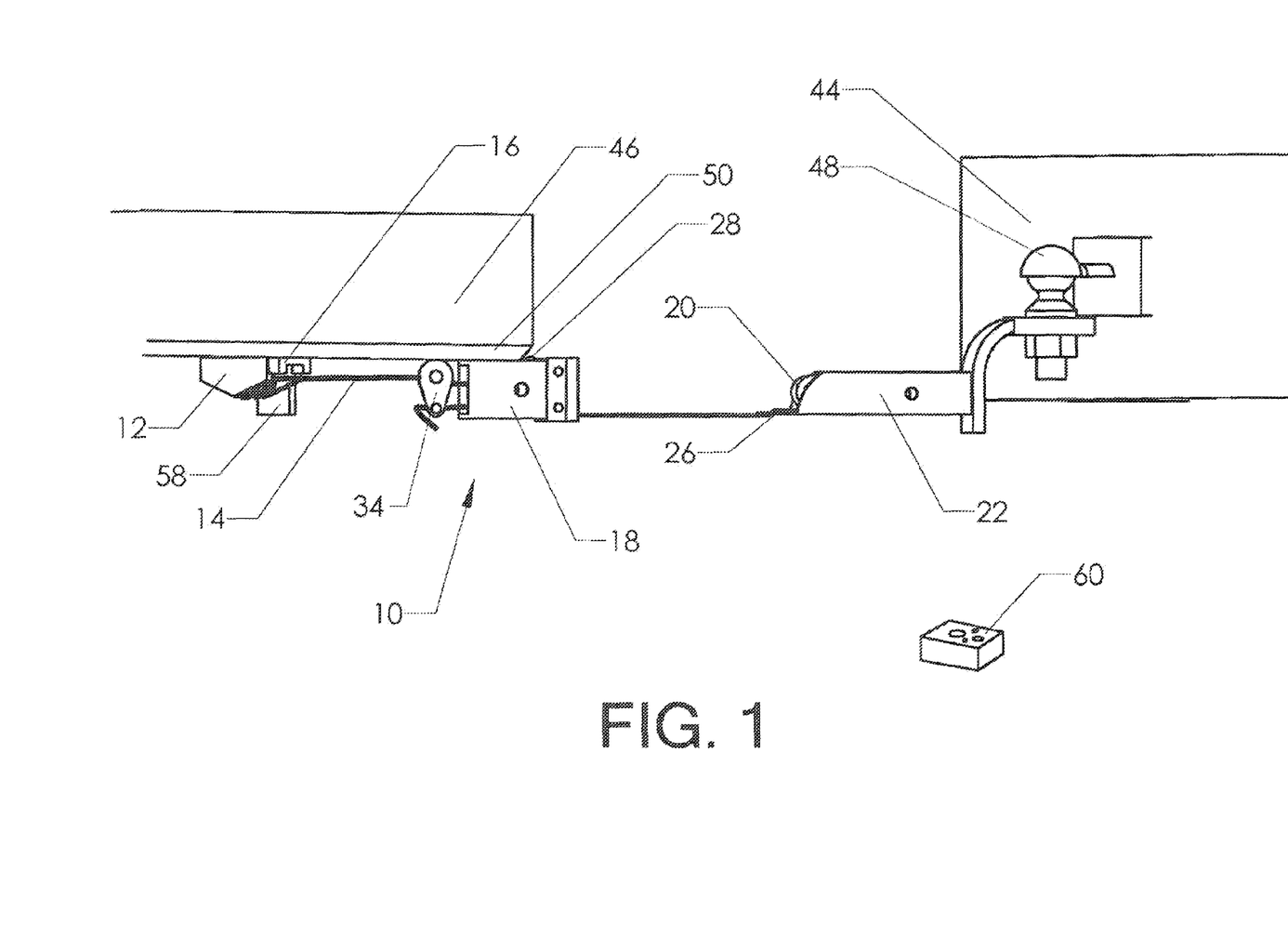
FIG. 1 is a perspective view, showing the present invention attached to a trailer.

FIG. 1 illustrates the present trailer hitch system 10 in the preferred embodiment. The trailer hitch system 10 is generally made up of winch 12, receiver 18 and hitch bar 22, which interact by way of winch wire 14. Trailer hitch system 10 enables hitch bar 22 to connect to a trailer 44 at varied distances and angles from vehicle 46. When trailer attachment 48 is attached to hitch bar 22, winch wire 14 is activated and winch 12 pulls hitch bar 22 and trailer attachment 48 into receiver 18 and thus secure to vehicle 46 (shown in FIG. 8). In the preferred embodiment winch 12 and receiver 18 are attached to the frame 50 of vehicle 46 by way of brackets 16 and 28. However, any known method of attaching component parts to the underside of a vehicle could be used. Guide 34 accepts a load and guides winch wire 14 from receiver 18 to winch 12. Winch 12 preferably contains transmitter 58 which transmits wirelessly to a fob 60 in order to activate and control winch 12, however winch 12 could also or in the alternative be wired into the electronics of the vehicle 46.

Figure 2:
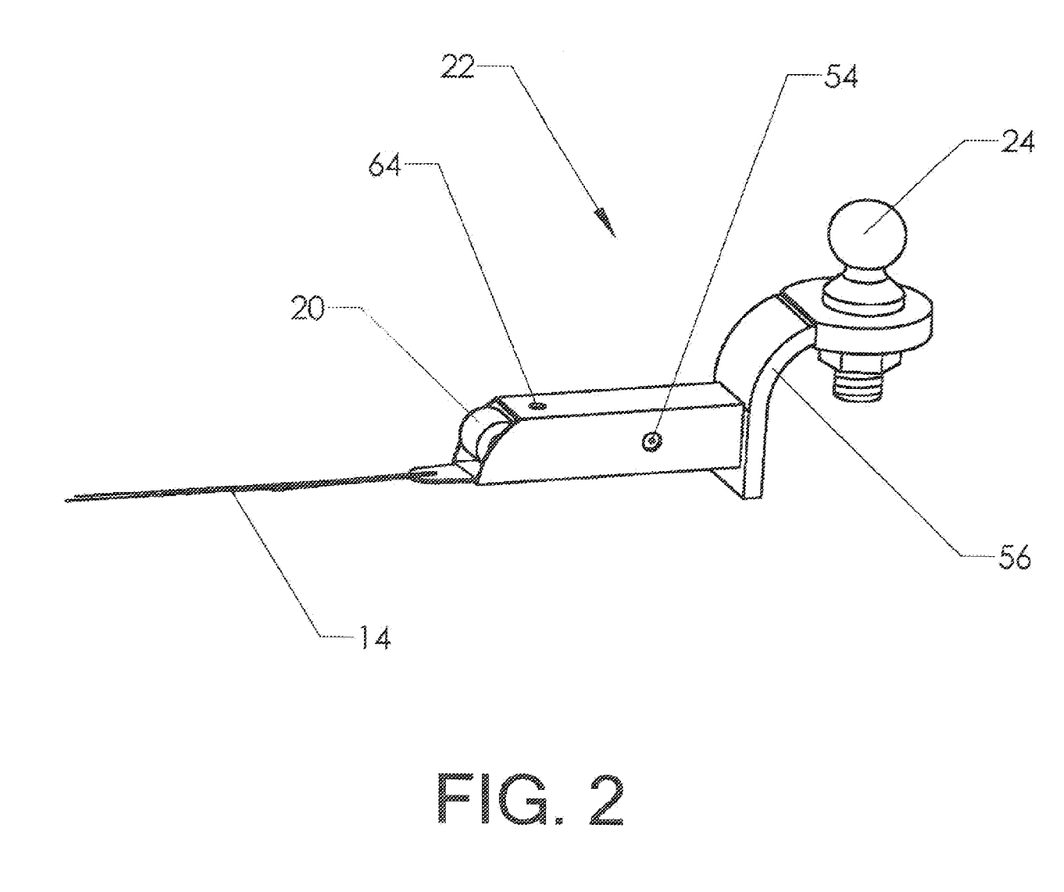
FIG. 2 is a perspective view, showing the hitch bar of the present invention.

A detail view of hitch bar 22 is shown in FIG. 2. As shown the manner of attachment of winch wire 14 to hitch bar 22 is of particular importance. Winch wire 14 travels under tab 26 and up through an eyelet. Thus, the force pulling winch wire 14 angles tab 26 (and hitch bar 22) upwardly such that tab 26 will not prevent the entry of hitch bar 22 into receiver 18. In the preferred embodiment winch wire 14 continues under roll bearing 20. Bolt 68 (illustrated in FIG. 10) attaches to hitch bar 22 and provides a secure attachment mechanism for winch wire 14, as further described below and illustrated in FIG. 10. However any known method of connected winch wire 14 to hitch bar 22 could be used, including the use of a winch wire that is fully integrated with hitch bar 22. Additionally, bolt top 64 is shown in FIG. 2. It is important that bolt top 64 is flush with the top of hitch bar 22 such that no part of hitch bar 22 hinders its entry into receiver 18.

Figure 6:
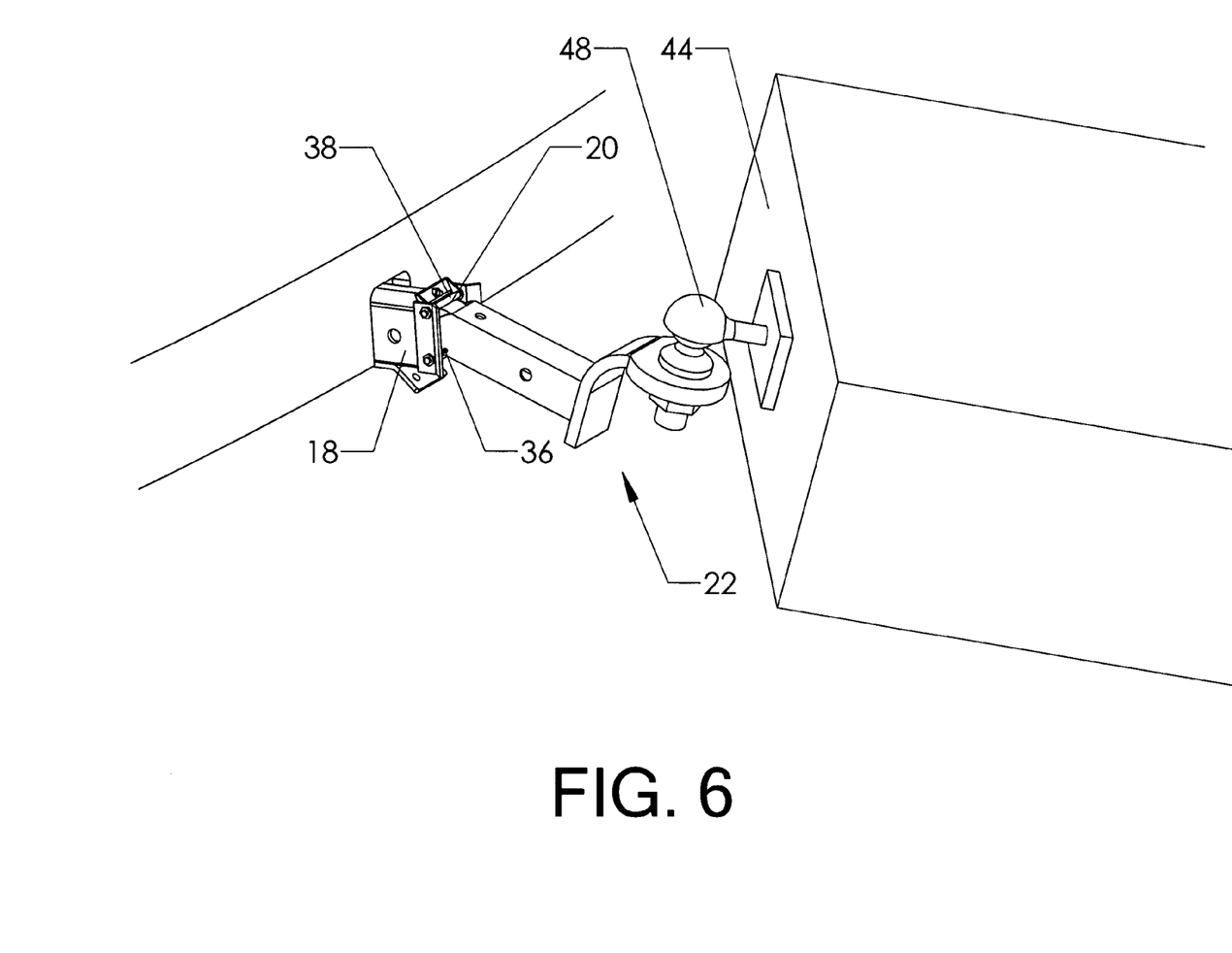
FIG. 6 is a perspective view, showing the hitch bar entering the receiver wherein a roll bearing is contacting a top guide.
Figure 8:
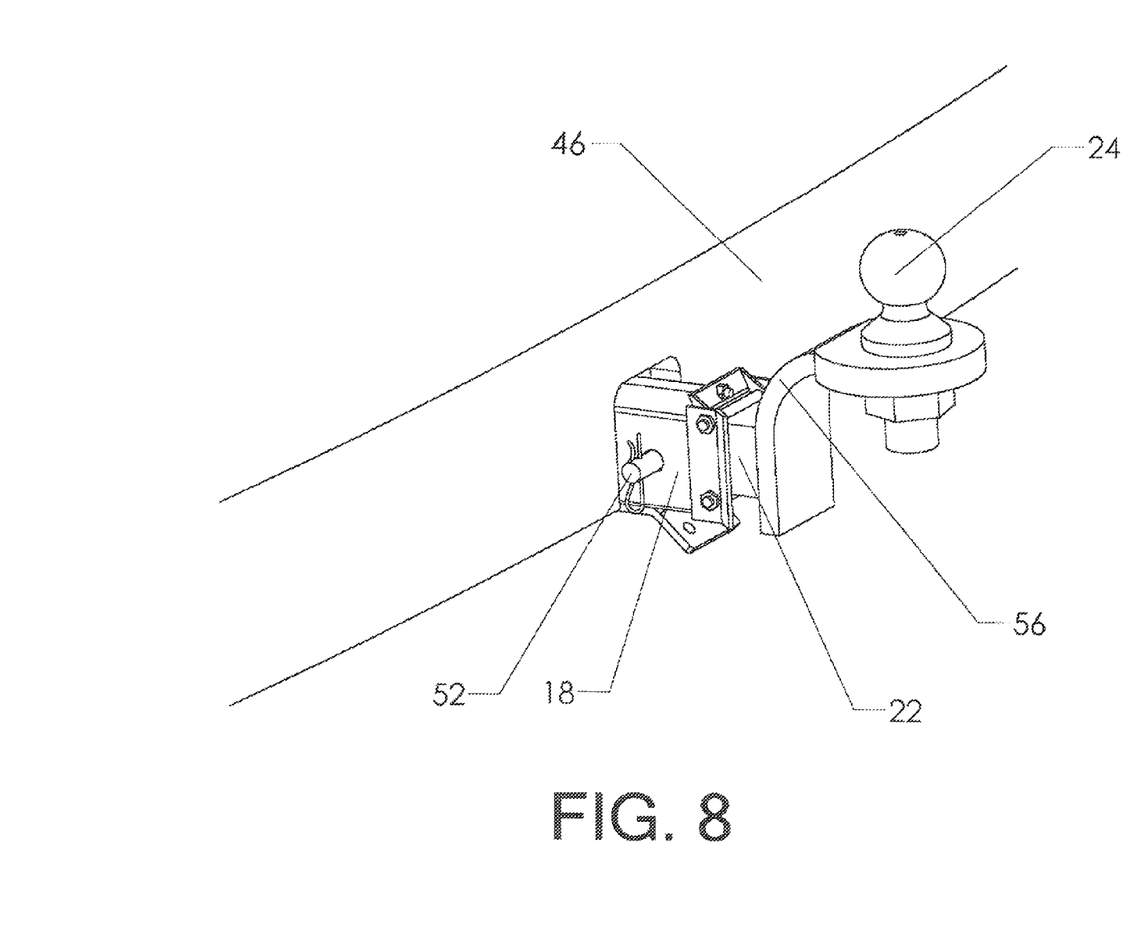
FIG. 8 is a perspective view, showing the present trailer hitch system in a closed position.

Roll bearing 20 is connected to hitch bar 22, such that roll bearing 20 reduces the friction between hitch bar 22 and receiver 18 as hitch bar 22 enters receiver opening 36 (as shown in FIG. 6). Hitch bar 22 contains a pin notch 54 for securing hitch bar 22 to receiver 18 (as shown in FIG. 8). Tongue 56 extends rearward to ball pin 24. Ball pin 24 can come in various sizes dependent on the load they carry.

Figure 3:
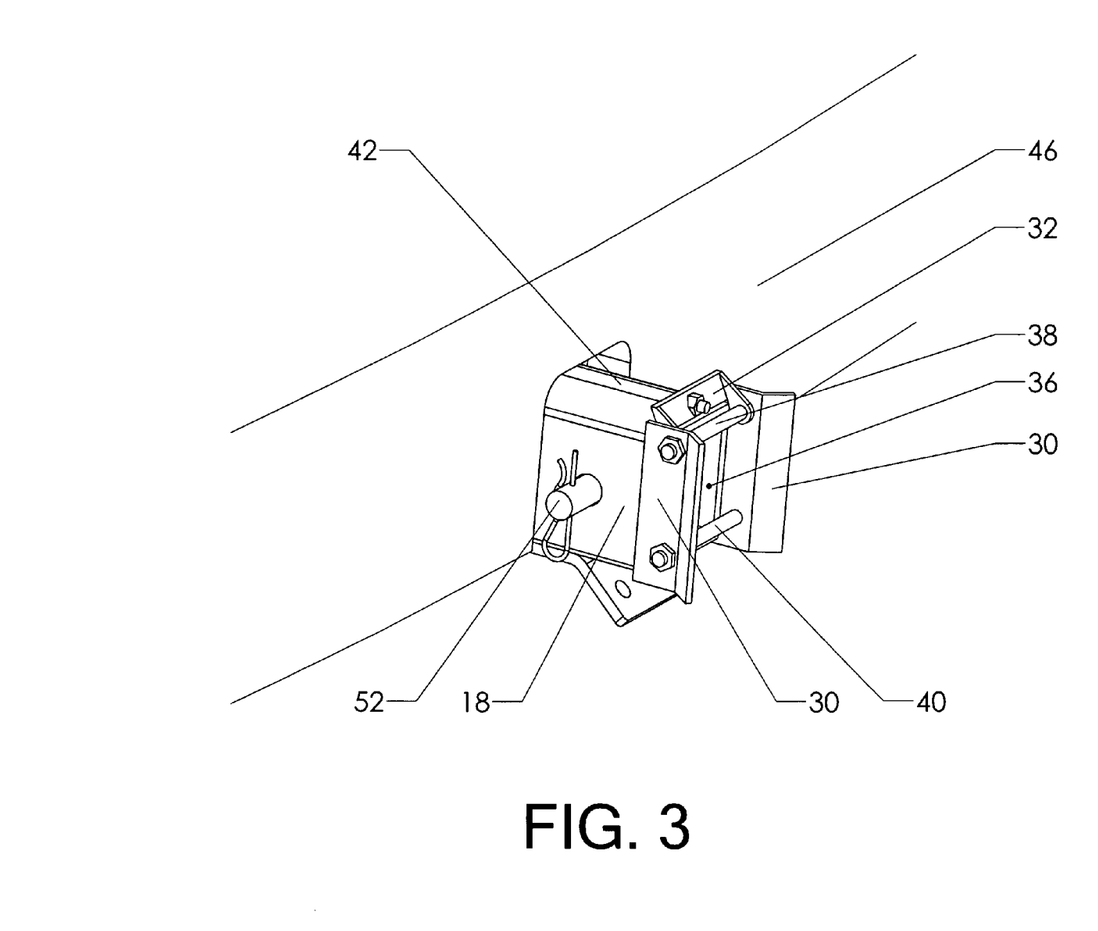
FIG. 3 is a perspective view, showing the receiver of the present invention.
Figure 7:
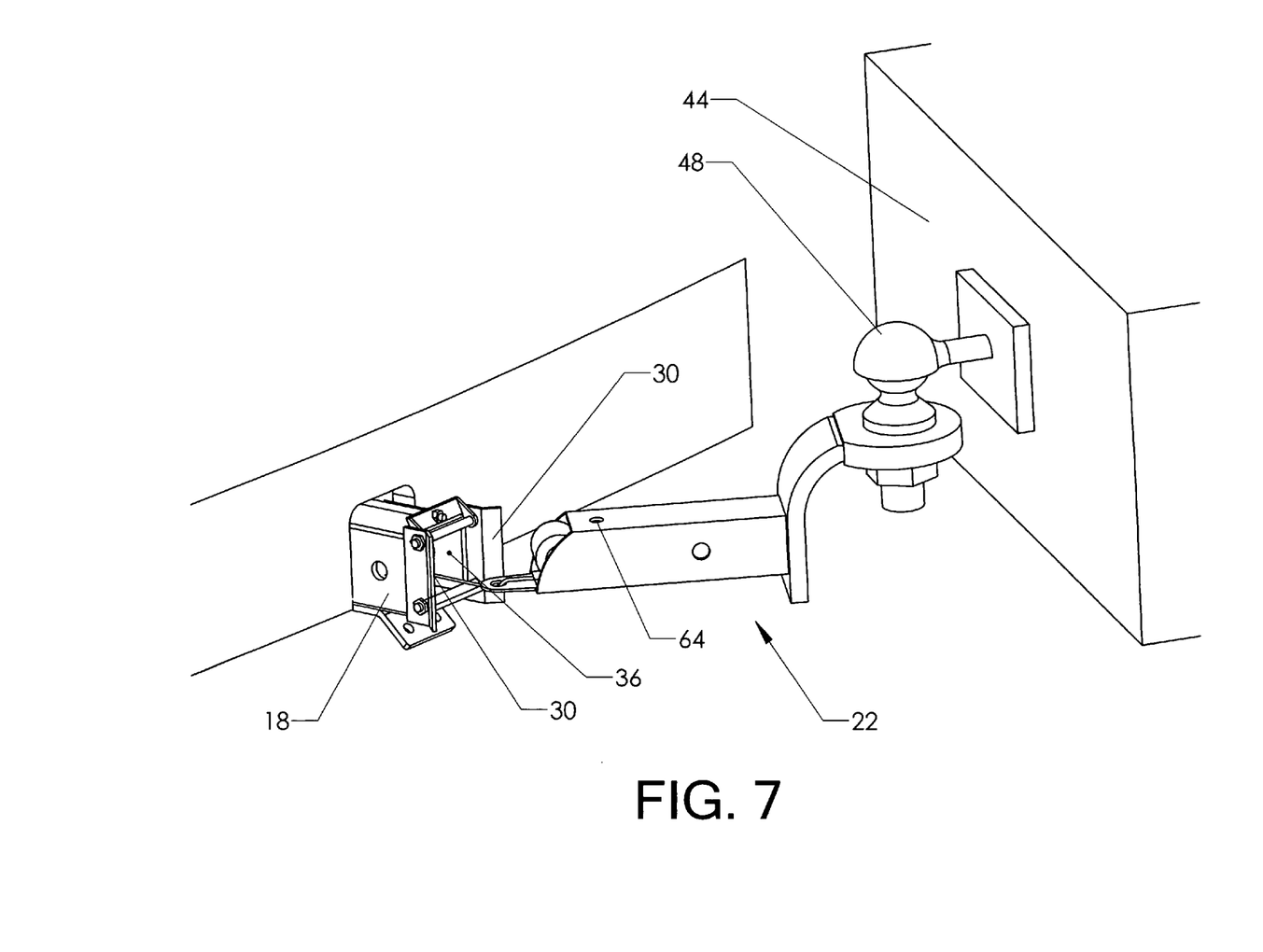
FIG. 7 is a perspective view, showing the hitch bar entering the receiver from an angle.

Receiver opening 36 is shown in further detail in FIG. 3. A tow hitch having a square receiver is known in the prior art. In the present trailer hitch system 10, receiver 18 is modified so as to allow for proper alignment of hitch bar 22 (shown in FIG. 8) as hitch bar 22 enters receiver opening 36 at various angular alignments (shown and further described in FIGS. 4-7). Receiver opening 36 has two side beams 30 attached to both sides of receiver opening 36. Top guide 38 and bottom guide 40 are attached to side beams 30 such that top guide 38 and bottom guide 40 define the top and bottom of receiver opening 36. Bottom guide 40 is preferably a rolling bar in order to assist the entry of hitch bar 22 into receiver 18. The rolling feature of bottom guide 40 reduces friction between hitch bar 22 and receiver 18 and directs hitch bar 22 into receiver opening 36 (as shown in FIG. 6-7). Top bar 32 and bolt 42 add support to top guide 38 and further connect receiver 18 to frame of vehicle 46.

Figure 4:
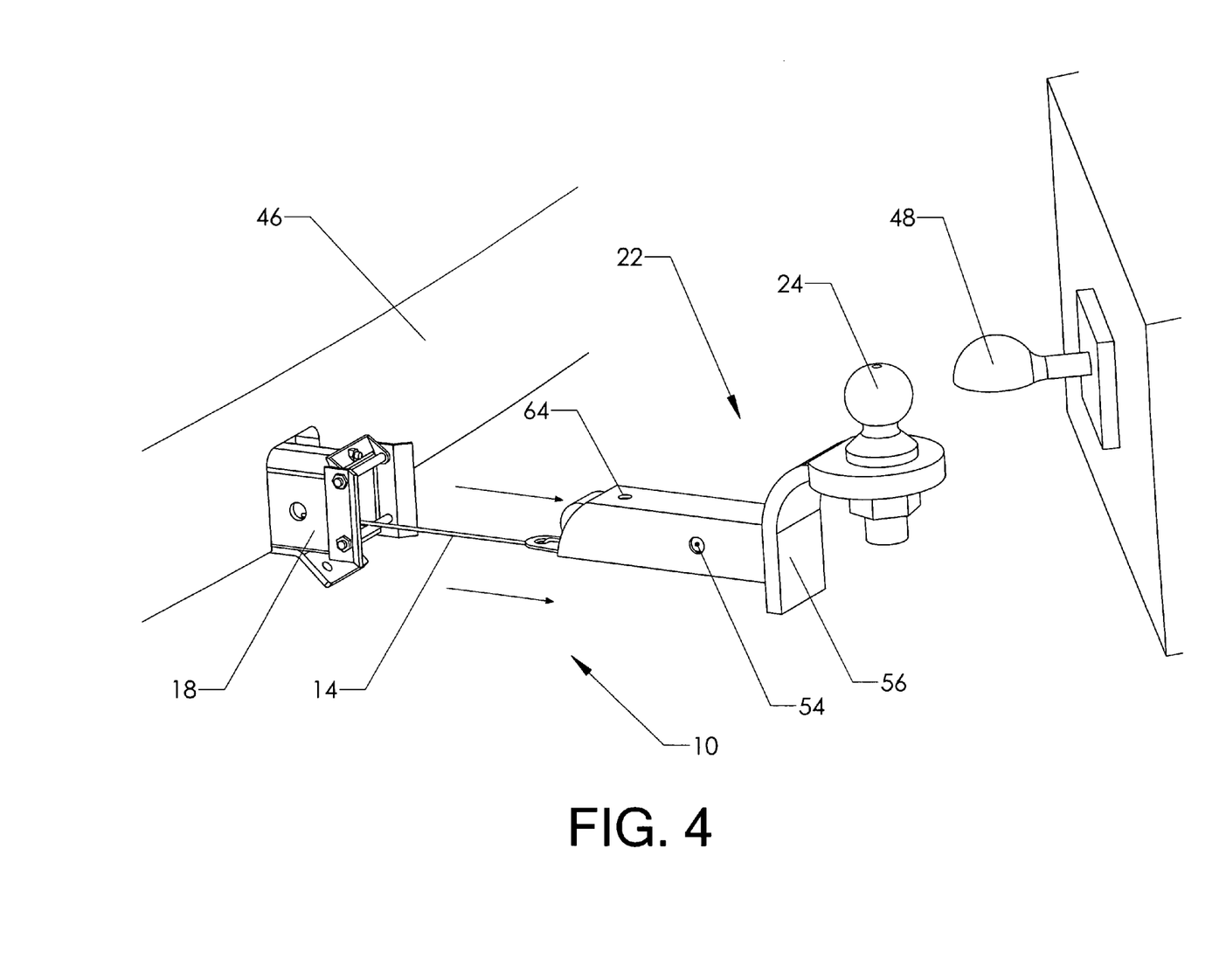
FIG. 4 is a perspective view, showing the hitch bar being pulled away from the receiver toward a trailer.

FIG. 4 illustrates hitch bar 22 being pulled away from vehicle 46 towards trailer attachment 48 (as illustrated by arrows). The present trailer hitch system 10 is such that a user can easily pull hitch bar 22 and winch wire 14 out from receiver 18 with little effort. Hitch bar 22 can be pulled away from receiver 18 in any direction or angle to attach ball pin 24 to trailer attachment 48.

Figure 5:
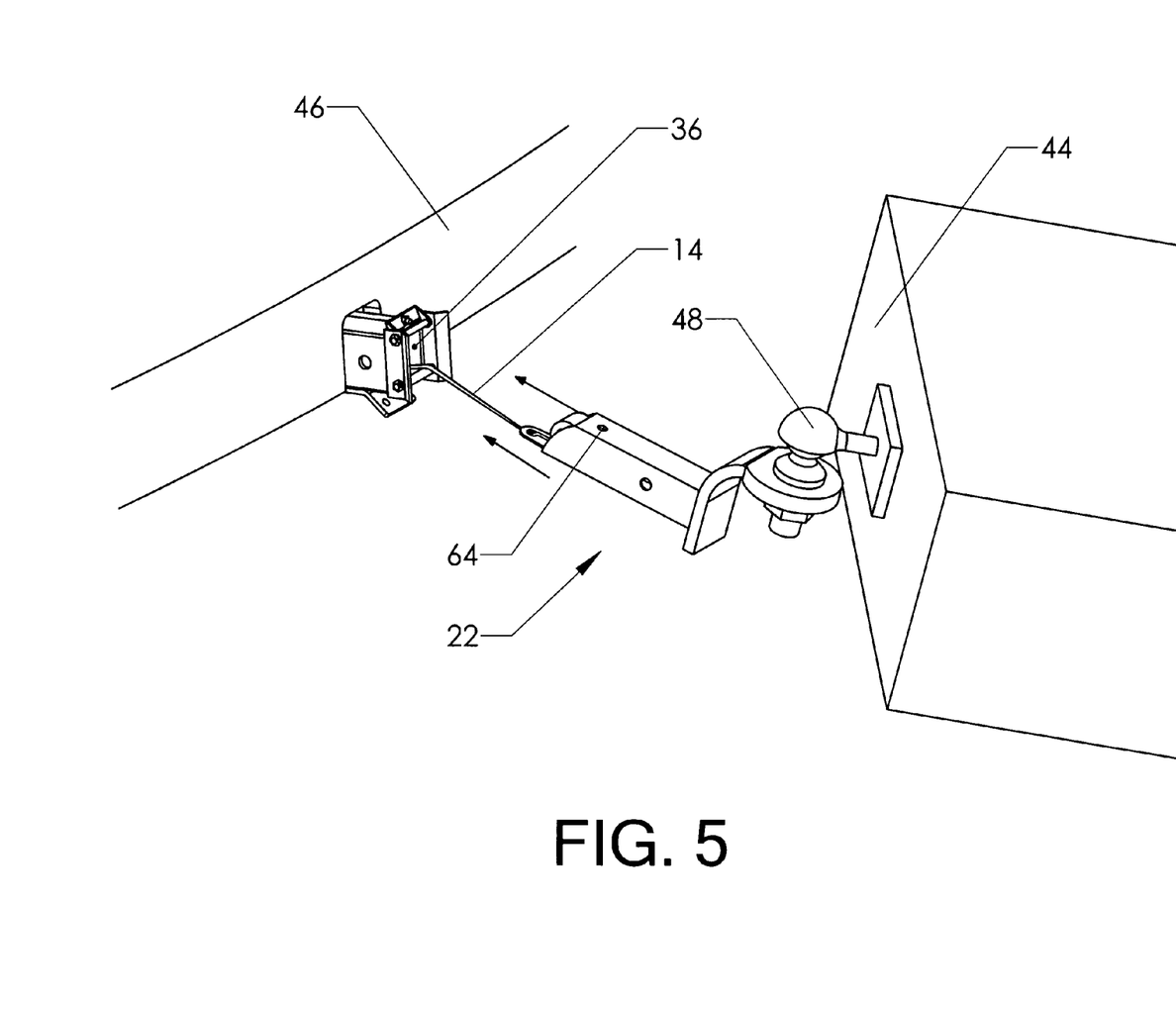
FIG. 5 is a perspective view, showing the hitch bar being pulled towards the receiver from a downward angular position.

Once hitch bar 22 is attached to trailer attachment 48, winch 12 (shown in FIG. 1) is activated and winch wire 14 begins to pull hitch bar 22 and trailer back towards receiver 18, as shown in FIG. 5. Due to the design of receiver opening 36 hitch bar 22 can approach receiver opening 36 from any angle, including, as shown in FIG. 5, from below receiver 18. For example, it may be desirable to pull trailer 44 up a hill, where trailer 44 includes a water vehicle located on a boat ramp. This would prevent the user from having to back vehicle 46 into the water.

When roll bearing 20 contacts top guide 38 as shown in FIG. 6 roll bearing 20 acts to minimize or prevent rubbing. Roll bearing 20 directs hitch bar 22 into receiver 18 preventing hitch bar 22 from becoming stuck prior to entering receiver 18 and/or slipping out of receiver as winch pulls hitch bar 22 towards receiver opening 36.

FIG. 7 shows hitch bar 22 entering receiver 18 from an angle. As hitch bar 22 contacts side beam 30, hitch bar 22 shifts around side beam 30 to enter receiver opening 36. Since trailer attachment 48 allows for a hinge-type movement hitch bar 22 can shift somewhat independently of trailer 44, lightening the load which is shifted around side beam 30. Side beams 30 are angled out and away from receiver opening 36, specifically to accommodate hitch bar 22 entry, directing hitch bar 22 in the appropriate manner towards receiver 18.

The illustration in FIG. 8 illustrates hitch bar 22 fully inside of receiver 18. Pin 52 secures hitch bar 22 inside of receiver 18 as is known in the prior art.

Figure 10:
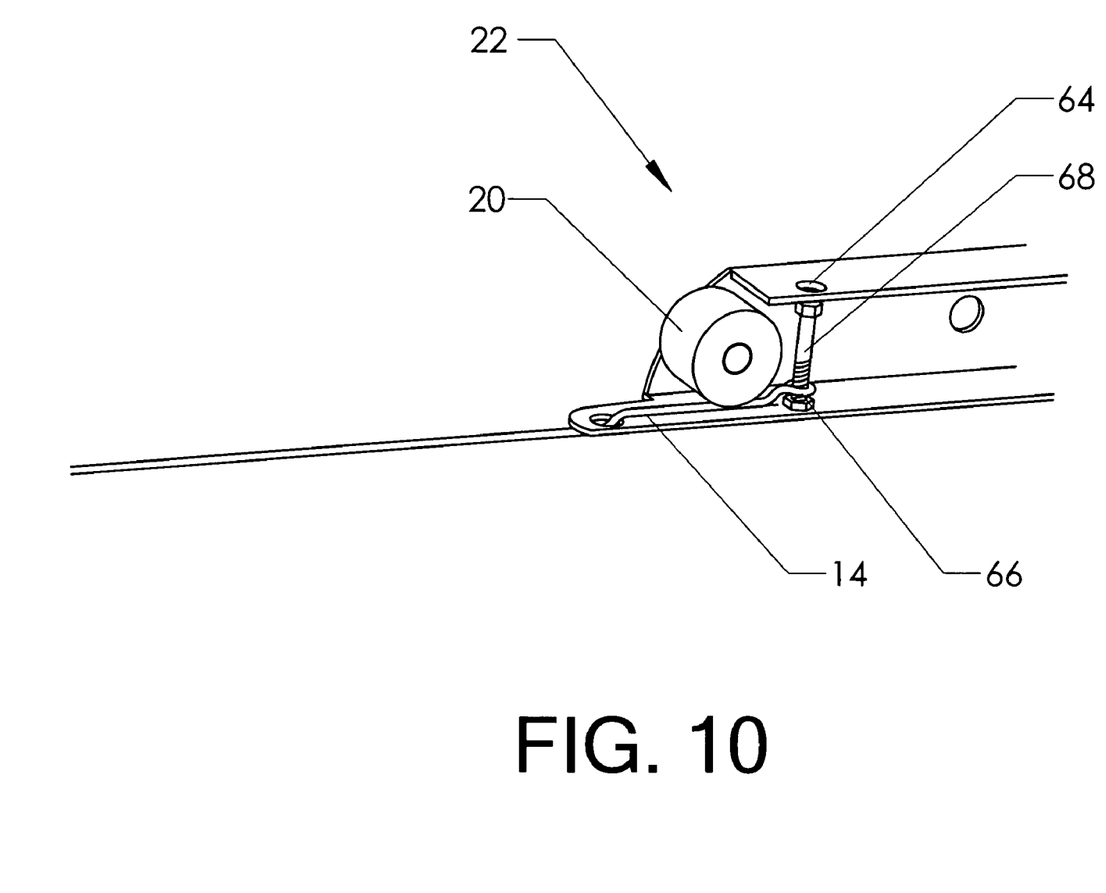
FIG. 10 is a perspective view, showing the hitch bar cut away to illustrate the attachment of winch wire to a tab and eyelet of the hitch bar.
Figure 11:
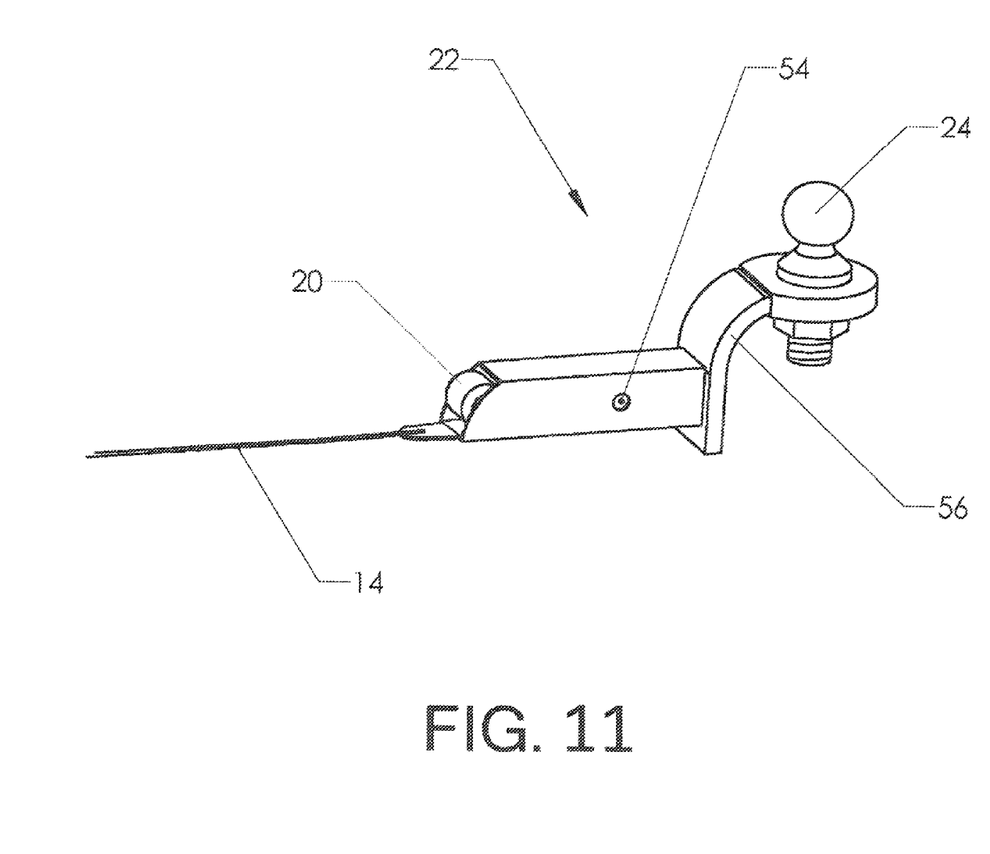
FIG. 11 is a perspective view, showing the hitch bar and the attachment of winch wire which is fully integrated with the hitch bar.

FIG. 10 further illustrates the attachment of winch wire 14 to hitch bar 22. Again, winch wire 14 travels up through eyelet located on tab 26 and under roll bearing 20. Bolt 68 is attached through winch wire loop 66, thereby securing winch wire 14 to hitch bar 22.

Figure 9:
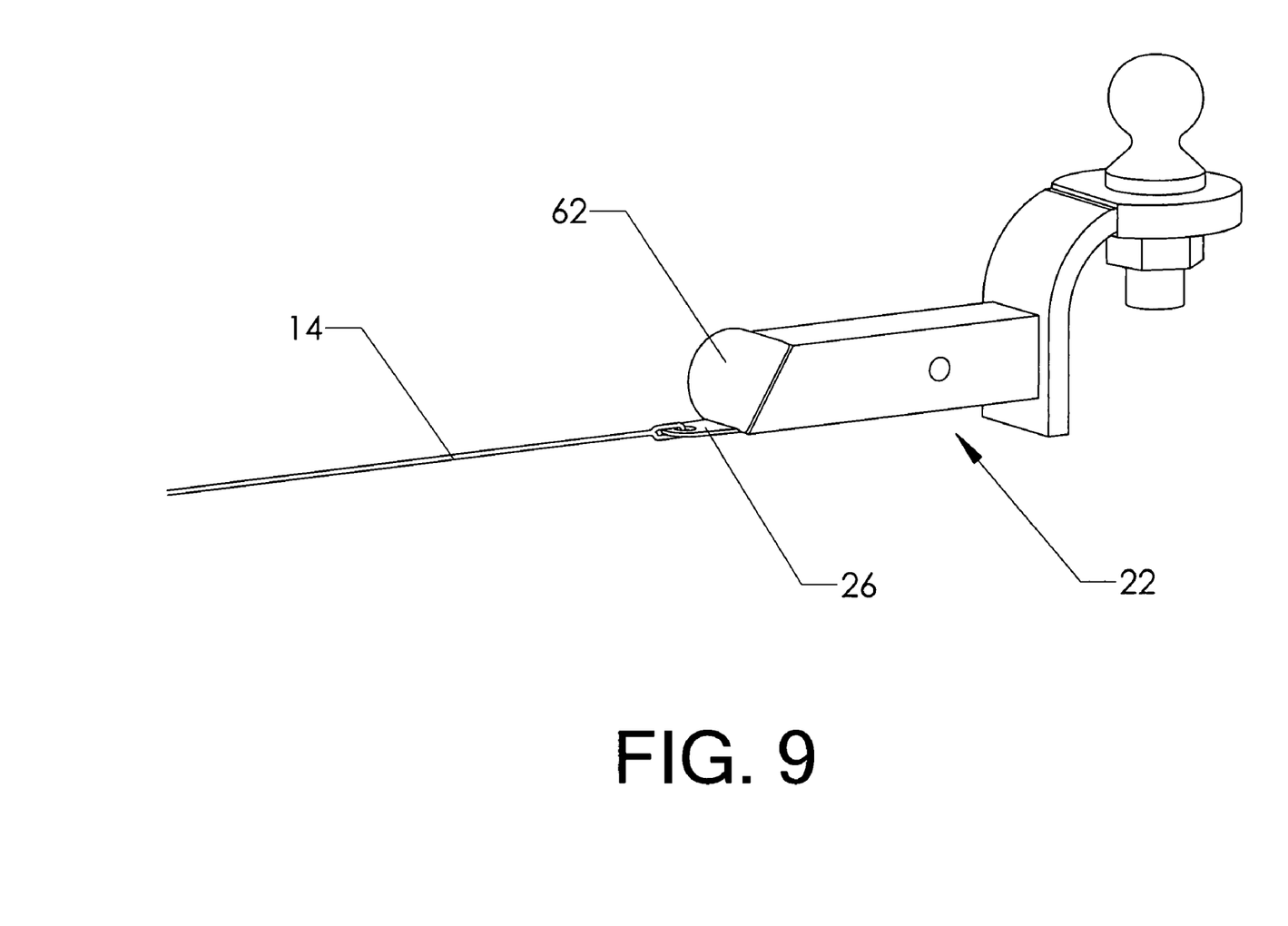
FIG. 9 is a perspective view, showing an alternate embodiment of the present invention, specifically the hitch bar.

An alternate embodiment of hitch bar 22 is shown in FIG. 9. Tab 26 is shorter than the preferred embodiment and a spherical bearing 62 sits at the forward facing side of hitch bar 22 such that bearing 62 rotates 180 degrees. Additionally, winch wire 14 is attached directly to the eyelet located on tab 26 of hitch bar 22.

The preceding description contains significant detail regarding the novel aspects of the present invention. It should not be construed, however, as limiting the scope of the invention but rather as providing illustrations of the preferred embodiments of the invention. As an example, roll bearing 20 can be a spherical bearing 62 which allows for 180 degrees of rotation. Additionally, trailer hitch system 10 can be modified to operate with any class of trailer hitch (i.e. Class I, II, III or IV, as classified by the Society of Automotive Engineers). Thus, the scope of the invention should be fixed by the following claims, rather than by the examples given.

We claim:

1. A trailer hitch system, for attaching a trailer with a trailer attachment to a vehicle, comprising:
   a. a winch attached to said vehicle;
   b. a receiver attached to said vehicle, wherein said receiver has a receiver opening;
   c. a winch wire attached to said winch;
   d. wherein said winch wire travels through said receiver, out of said receiver opening and attaches to a hitch bar; and
   e. a roll bearing rotatable attached to said hitch bar, said roll bearing configured for contacting said receiver opening.

2. A trailer hitch system as recited in claim 1, further comprising a top guide attached proximate to said receiver opening.

3. A trailer hitch system as recited in claim 2, further comprising a bottom guide attached proximate to said receiver opening.

4. A trailer hitch system as recited in claim 2, wherein said roll bearing rotates about an axis within said hitch bar, such that as said roll bearing enters said receiver opening said roll bearing contacts said top guide.

5. A trailer hitch system as recited in claim 1, further comprising:
   a. a tab attached to said hitch bar; and
   b. wherein said winch wire attaches to said tab such that said tab enters said receiver opening prior to said hitch bar entering said receiver opening.

6. A trailer hitch system as recited in claim 5, further comprising an eyelet, wherein said winch wire travels under said tab and through said eyelet to attach to said hitch bar.

7. A trailer hitch system as recited in claim 1, further comprising a guide attached to said receiver, wherein said winch wire travels from said winch through said guide and enters said receiver.

8. A trailer hitch system as recited in claim 1, wherein said winch wire is fully integrated with said hitch bar.

9. A trailer hitch system as recited in claim 1, wherein said roll bearing is cylindrical.

10. A trailer hitch system as recited in claim 1, wherein said roll bearing is spherical.

11. A trailer hitch system, for attaching a trailer to a vehicle, comprising:
   a. a winch attached to said vehicle;
   b. a receiver attached to said vehicle, wherein said receiver has a receiver opening;
   c. wherein said receiver opening is defined by a top guide, a bottom guide and at least two side beams;
   d. wherein a winch wire attached to said winch travels through said receiver, out of said receiver opening and attaches to a hitch bar at a tab; and
   e. a roll bearing rotatable attached to said hitch bar, said roll bearing configured for contacting said receiver opening.

12. A trailer hitch system as recited in claim 11, further comprising a guide attached to said receiver, wherein said winch wire travels from said winch through said guide and enters said receiver.

13. A trailer hitch system as recited in claim 11, wherein said at least two side beams are L beams.

14. A trailer hitch system as recited in claim 13, wherein said at least two side beams attach said top guide and said bottom guide proximate to said receiver opening.

15. A trailer hitch system as recited in claim 11, wherein said top guide is cylindrical.

16. A trailer hitch system as recited in claim 11, wherein said bottom guide is cylindrical.

17. A trailer hitch system as recited in claim 11, wherein said roll bearing is cylindrical.

18. A trailer hitch system as recited in claim 11, wherein said roll bearing is spherical.

19. A trailer hitch system as recited in claim 11, wherein said winch wire is fully integrated with said hitch bar.

20. A trailer hitch system as recited in claim 11, wherein said winch is controlled by a fob located remotely from said winch.

* * * * *